(12) United States Patent
Zhou

(10) Patent No.: US 7,832,891 B2
(45) Date of Patent: Nov. 16, 2010

(54) ILLUMINATING DEVICE WHICH ACCESSES NATURAL ENERGY

(75) Inventor: Jian-Lin Zhou, Dong-guan (CN)

(73) Assignee: Mig Technology Inc., Guang-Dong Province (CN)

( * ) Notice: Subject to any disclaimer, the term of this patent is extended or adjusted under 35 U.S.C. 154(b) by 231 days.

(21) Appl. No.: 12/234,646

(22) Filed: Sep. 20, 2008

(65) Prior Publication Data
US 2010/0073921 A1 Mar. 25, 2010

(51) Int. Cl.
*F21L 13/00* (2006.01)
(52) U.S. Cl. .................. 362/192; 362/96; 362/345; 362/373
(58) Field of Classification Search .............. 362/96, 362/192, 218, 345, 364, 373, 253; 40/440
See application file for complete search history.

(56) References Cited

U.S. PATENT DOCUMENTS

| 4,616,298 A * | 10/1986 | Bolson .................. 362/192 |
| 6,923,552 B2 * | 8/2005 | Tseng .................... 362/192 |
| 7,299,632 B2 | 11/2007 | Laing et al. ............. 60/641.8 |
| 2004/0187907 A1 | 9/2004 | Morgal ................... 136/246 |

* cited by examiner

*Primary Examiner*—John A Ward
(74) *Attorney, Agent, or Firm*—Muncy, Geissler, Olds & Lowe, PLLC

(57) ABSTRACT

An illuminating device which accesses natural energy is an independent cylindrical unit, an interior is provided with a once-through passage to absorb solar thermal radiation wave which then operates on air molecules inside the once-through passage to increase an ionization speed, so as to form resultant force. The resultant force is then converted into mechanical energy which operates a suspended air screw to rotate, so as to drive a magneto generator to convert into an electric current which is used for illuminating through an access control.

15 Claims, 7 Drawing Sheets

ILLUMINATING DEVICE WHICH ACCESSES NATURAL ENERGY

BACKGROUND OF THE INVENTION a) Field of the Invention

The present invention relates to an illuminating device which accesses natural energy, and more particularly to an illuminating device wherein a solar thermal radiation wave is absorbed and then operates air molecules to form mechanical energy which is converted into an electric current to illuminate through an access control.

b) Description of the Prior Art

There are a lot of designs related to energy saving or for seeking various approaches to gain electrical energy recently. In many kinds of approaches, if an approach can directly access energy in natural environment to convert into electricity or thermal power, then that approach is most environmentally benign. Today, there is a heat convection wind driven generator device which utilizes a turbo blade, with an interior of the device being coaxially connected to a power generator and the entire power generator device being provided at an upper corner position of a point-shape roof top, such that when temperature inside a house is too high, hot air will pass through the turbo blade to drive the power generator device.

The U.S. Pat. No. 7,299,632 discloses a practical solar power generating technology wherein solar energy is concentrated to an optical transmission element by a condensing method to result in a solar energy electric field through an operation of a heat sink end. Furthermore, in the US Patent Publication No. 20040187907, energy is converted after condensing sunlight.

On the other hand, in a class of IPC No. f03d9/00, there is a lot of equipment, waste heat of which is collected to produce flow energy to drive a power generator to move.

As the aforementioned designs utilize the heat convection method to produce electricity, a source of kinetic energy should be dependent upon a physical condition of a target to be used, such as a temperature condition on a roof top of a factory, and a place of usage will be more limited.

SUMMARY OF THE INVENTION

The primary object of the present invention is to provide an illuminating device which accesses natural energy, wherein a solar thermal radiation wave is absorbed and then operates air molecules inside the device, allowing an ionization speed between each air molecule to increase, and forming mechanical energy through a change of volume to convert into an electric current which is used to illuminate after being accessed. The illuminating device includes an independent cylindrical unit which is formed by surrounding with a heat conductor and can be put upright on a ground surface, with a once-through passage being formed in an axis. After an environmental thermal radiation wave has been absorbed by the heat conductor, the heat wave is diverted into the once-through passage by an emission end, allowing the air molecules contained in the once-through passage to be excited by the heat wave that an ionization speed between the air molecules is increased and volume is changed at a same time, so as to result in upward buoyant force to push a suspended air screw, thereby driving a power generator device to produce an electric current. The electric current flows toward an accumulator device inside the illuminating device and provides an illuminating device which uses an LED (Light Emitting Diode) element to excite into light after being accessed.

A second object of the present invention is to provide an illuminating device which accesses natural energy, wherein inside a once-through pipe but at a coaxial and radial position of a smaller radius is provided with a reflection element toward an axis, so as to increase thermal radiation and an energy-storage effect of the axis.

A third object of the present invention is to provide an illuminating device which accesses natural energy, wherein the accumulator device is provided at a bottom of the once-through passage, allowing waste heat which is resulted during an ionization reaction to directly operate above the once-through passage.

A fourth object of the present invention is to provide an illuminating device which accesses natural energy, wherein the once-through passage is formed by surrounding with a plurality of heat conducting slab materials.

A fifth object of the present invention is provide an illuminating device which accesses natural energy, wherein the heat conductor is provided with strong mechanical force and can be made by a heat conducting metal.

A sixth object of the present invention is to provide an illuminating device which accesses natural energy, wherein a topmost end of the once-through passage is provided with an auxiliary wind driven generator device.

A seventh object of the present invention is to provide an illuminating device which accesses natural energy, wherein the illuminating device can be further operated through a logic circuit that a working time can be defined at night.

To enable a further understanding of the said objectives and the technological methods of the invention herein the brief description of the drawings below is followed by the detailed description of the preferred embodiments.

DETAILED DESCRIPTION OF THE PREFERRED EMBODIMENTS

The present invention provides an independent cylindrical device, wherein a solar thermal radiation wave is absorbed and then operates air molecules inside the device, allowing an ionization speed between the air molecules to increase, and forming mechanical energy through a change of volume to convert into an electric current which is used to illuminate after being accessed.

In terms of a physical phenomenon of gas, temperature is related to pressure under a volume and without external force. However, for the temperature-pressure reaction in an open space, as that space is under the pressure of natural environment, a pressure difference only occurs at an elevation and the pressure is at a certain value depending upon a fixed location;

hence, a magnitude of temperature is only dependent upon a state of an external working medium and the pressure can be taken as a constant. The working medium of the present invention is the solar thermal radiation wave. In addition, temperature is related to a volume, and gas will be expanded upon being heated and result in force after being confined by a specific space, with that force being resultant force formed by directing and collecting expansion force, so as to operate to rotate a blade.

To convert natural energy into electric energy, the present invention specifically utilizes a heat conductor which can absorb heat and emit the thermal radiation wave to a place directionally, allowing an ionization speed between air molecules of the heated space to increase, thereby resulting in flow energy to generate electricity.

Figure 1:
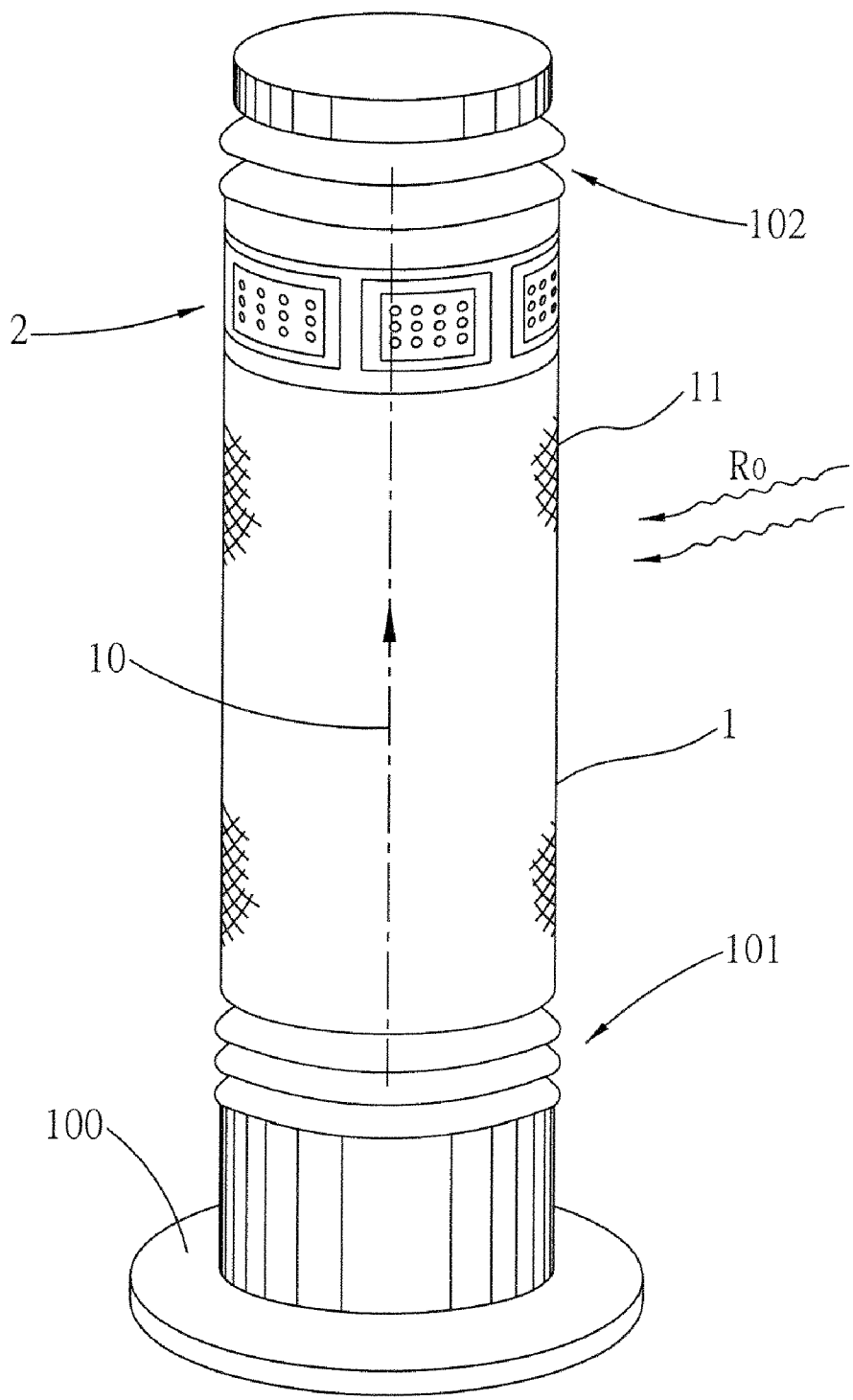
FIG. 1 shows a three-dimensional view of an implementation of the present invention.

Referring to FIG. 1, a product of the present invention can be an independent cylindrical unit that is put upright on a ground surface, with an interior being axially formed with a once-through passage 10 which is constituted by surrounding with a heat conductor 1. An upper and a lower end of the once-through passage 10 are provided respectively with an inlet 101 and an outlet 102, and a bottom is supported by a chassis 100.

An exterior of the once-through passage 10 is a heat absorption end 11 formed by the heat conductor 1; therefore, when the heat conductor 1 receives a solar thermal radiation wave $R_0$, through transmission by a core of the heat conductor 1, a heat mass at the exterior will be guided toward the once-through passage 10, allowing the air inside the once-through passage 10 to expand due to the increase of ionization speed between the air molecules. The expansion rate is associated with a change of volume ratio at a same time. In addition, environmental air enters from the inlet 101 through pressurization of atmospheric pressure, allowing the air inside the once-through passage 10 to produce an upward heat flow effect, with the resultant force being accumulated to be converted into mechanical energy to generate electricity.

According to the Joule's first law of thermodynamics, energy in a heat form is converted into work which is in a form of mechanical energy. In the present invention, the heat-work conversion is utilized to form the mechanical energy which operates power generator equipment to produce an electric current that is applied in illuminating through an access control.

Figure 3:
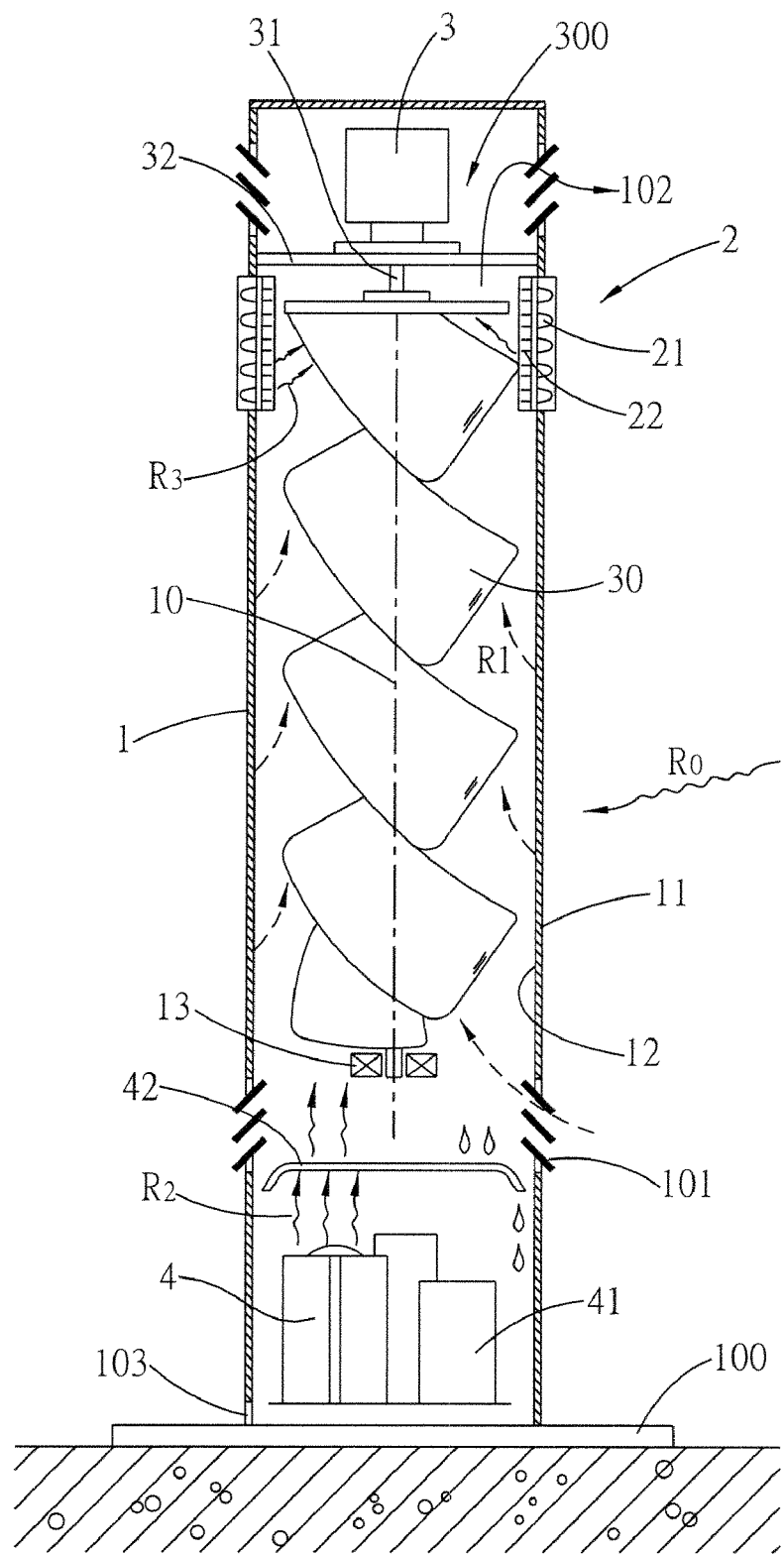
FIG. 3 shows a side view of an assembly structure of the present invention.

Accordingly, the once-through passage of the present invention is provided with a certain height, and the heat absorption end 11 can be arranged upward from the inlet 101 to the outlet 102 continuously. Therefore, a flow speed per unit distance inside the once-through passage 10 will be different from bottom to top. According to the Newton's second law of motion, it is known that after an upward movement speed has been produced by a thermal ascending effect to the air molecules per unit volume inside the once-through passage 10, the air below will gain force formed by the same aforementioned thermal reaction to operate force along a same direction of movement to the air per unit volume above, and thereby acquiring an acceleration. This speed is the ascending flow speed. Furthermore, the once-through passage 10 of the present invention is an upright cylindrical passage in principle and therefore is provided with an approximately uniform cross sectional area. In association with the aforementioned change of speed, for a segment that is close to the outlet 102, the maximum resultant force per unit time can be formed, such that an air screw in a continuous spiral shape can be driven sequentially with full capacity during a displacement change (as shown in FIG. 3).

Figure 2:
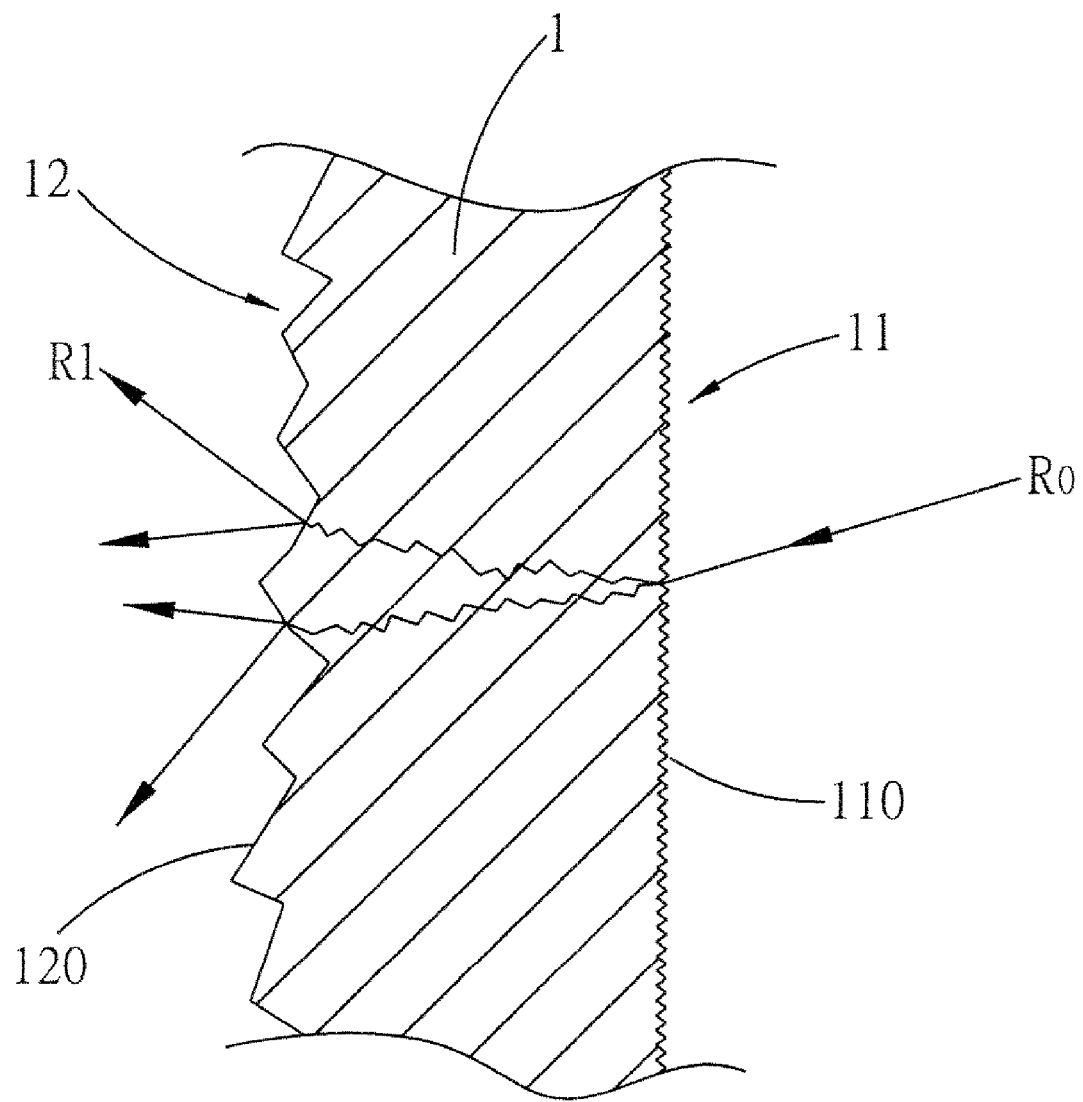
FIG. 2 shows a schematic view of a working principle of heat conductor of the present invention.

The heat conductor 1 (as shown in FIG. 2) will absorb the external solar thermal radiation wave and that thermal radiation wave includes invisible far infrared and visible glowing wave.

After being absorbed by the heat absorption end 11 of the heat conductor 1, the external thermal radiation wave $R_0$ will be absorbed by the body of the heat conductor 1. The heat absorption end 11 is made by a material of a good absorption rate, and the heat mass which is acquired by diverting the thermal radiation is transmitted from the body of the heat conductor 1. That transmission is a kind of heat balance, and when the heat mass reaches to the other end, a release operation is formed; therefore, the heat mass that enters from the heat absorption end 11 can be directed to the emission end 12 which faces toward the aforementioned once-through passage 10.

The emission end 12 will emit the heat mass, wherein a surface area of the emission end 12 is larger than that of the heat absorption end 11 in principle, and an emission rate of the emission end 12 should be higher than that of the heat absorption end 11, with the emission rate being increased by expanding the surface area. Therefore, when the surface area is enlarged, the emission rate is also increased, for the same material. To enlarge the surface area, a rough surface 120 can be implemented, and that rough surface 120 can be in a regular or irregular shape.

A surface of the heat absorption end 11 can be configured as a rough surface 110 implemented by using textures which are aligned parallel and alternately, alternate thick lines, bumps or diamond-shape bumps, primarily to acquire straight irradiation of the vertical solar radiation wave $R_0$ in more orientations. In principle, the emission rate of the heat absorption end 11 should be less than that of the emission end 12. Therefore, after entering into the heat conductor 1, the solar radiation wave $R_0$ will be transmitted toward the emission end 12 directionally to directly enter into the once-through passage 10.

The aforementioned heat conductor 1 is made by a material of good heat absorption rate and emission rate, such as a blackbody. However, the blackbody does not exist in nature, and is only a theoretical object. Yet, development of related technologies provides a plurality of blackbody-like technologies, such as a blackbody tube. The existing blackbody is generally made by a ceramic mineral material, which is formed by mixing mineral with a black material, sintering, burning black again, or solidifying in normal temperature or under heating, with ingredients including a heat conducting metal and an outer shape being designed in many styles according to manufacturing of mold tools.

Secondary to the blackbody tube is a metal alloy material, wherein after a three-dimensional configuration has been made by using a metal of a lower thermal resistivity, a thermal radiation wave enters from a surface and transmits from the other end by a heat balance effect. When the metal is implemented in accordance with the present invention for heat conduction, an inner surface area should be larger than an area of the absorption surface, such that a higher emission ration can be achieved, allowing a heat mass absorbed to point toward a direction of operation. The heat conducting metal is an alloy material and is preferably an aluminum alloy.

Referring to FIG. 3, it shows an entire implementation of the present invention. The once-through passage 10 is provided with a power generator unit 300 at an axis line close to the outlet. That power generator unit 300 includes a suspended longitudinal air screw 30 and a magneto generator 3, the air screw 30 is connected to the magneto generator 3 through a transmission shaft 31, and the magneto generator 3 is assembled at an upper end of the once-through passage 10 by a truss 32, wherein the magneto generator 3 is reversely assembled at the upper end through the truss 32, the transmission shaft 31 faces downward and the air screw 30 is suspended on the transmission shaft 31. Therefore, a weight of the air screw 30 is supported by the truss 32 through the transmission shaft 31, and operation friction force is inducted at a pivot structure of the magneto generator 3. A lower end of the air screw 30 can be a free end and hence, the air screw 30 will be easily agitated by tiny external force in any direction; whereas, that agitation function provides a large probability to eliminate static friction force, thereby allowing the air screw 30 to rotate easily.

The once-through passage 10 is formed by surrounding with the heat conductor 1, a topmost end is provided with the air outlet 102, and a bottom position is provided with the inlet 101 to suck in atmospheric pressure. After the heat absorption end 11 on the external surface of the heat conductor 1 has absorbed the solar radiation wave $R_0$ of sunlight, a function as shown in FIG. 2 will be resulted that the radiation wave $R_0$ will be transmitted toward the emission end 12 to form a radiation wave $R_1$. That radiation wave $R_1$ will operate the original air inside the once-through passage 10 to increase temperature of the air, allowing a higher ionization speed to be produced between the air molecules to expand the air, and forming the change of volume during expansion, at a same time. Therefore, a forced air flow will be produced to the air inside the once-through passage 10 and the air screw 30 can rotate by mechanical energy of that air flow, thereby driving the magneto generator 3 to produce a power generating operation by cutting through a magnetic field. The electric current produced will then be transmitted to an internal accumulator device 4 for storage through a lead wire (not shown in the drawing).

The heat absorption end 11 of the heat conductor 1 continuously receives irradiation of the solar radiation wave $R_0$ and then transmits toward the once-through passage 10. By this continuous operation, the cold air that enters into the inlet 101 is excited and operated as aforementioned, allowing a drift speed of the air molecules to be increased actively that the air is expanded, with the expanded volume being released from the outlet 102. Therefore, the continuous heat absorption generates a chain of heat-work reaction, and continuous and effective kinetic energy is resulted, in accordance with the aforementioned Newton's second law of motion, additionally. That kinetic energy is collected as a rotational movement to drive the magneto generator 3 through the air screw 30, such that under the irradiation of the solar radiation wave $R_0$, the magneto generator 3 can continuously generate the electric current which is stored in the accumulator device 4 through the wiring.

The accumulator device 4 can be provided with a control circuit 41 which determines a state of providing the electricity current. If the accumulator device 4 is recharged and electrical charge is full, then the recharging will be disconnected through a control of the control circuit 41. On the other hand, if the electricity of the accumulator device 4 is depleted, in order to prevent desalination for a lead acid battery, for example, then a pre-configured condition of the control circuit 4 can be used to stop providing the electricity at that time, so as to maintain a lifetime of the accumulator device 4. In addition, to an illuminating device 2, a working time of which can be instructed to only operate at dark environment; this time control can be achieved by providing a light sensitive element at the control circuit 41, wherein a design of the control circuit 41 is an ordinary circuit for battery protection and timed operation, which is not described further.

An exterior surface of the once-through passage 10 is provided with the illuminating device 2 which is formed by a light emitting diode element 21. The light emitting diode 21 will produce waste heat during operation, and in order to maintain a stable operation of the light emitting diode element 21, the waste heat should be released through a heat sink end 22 which is located inside the once-through passage 10. On the other hand, a waste heat radiation wave $R_3$ produced can form an auxiliary function to excite the air in the once-through passage 10.

The aforementioned illuminating device 2, magneto generator 3, accumulator device 4 and control circuit 41 that are used to assemble the once-through passage 10 can be connected through a set of wires distributed in the once-through passage 10 (not shown in the drawing).

The accumulator device 4 is provided below the once-through passage 10 and is below a level of the inlet 101. During the recharging and charging process of the accumulator device 4, electrochemical waste heat produced by the ionization reaction can be used to assist heating. In other words, when the accumulator device 4 is operating, a radiation wave $R_2$ produced will be transmitted directly toward an upper side of the once-through passage 10 and will first operate on the ambient air that has entered from the inlet 101 to perform initial exciting, allowing the excited air to be preheated upon reaching a middle segment of the once-through passage 10, so as to reduce a loading of the radiation wave $R_1$. Furthermore, above the accumulator device 4 can be provided with an eave 42 to shade from rain water that may flow into and be expelled from a drain port 103.

Whether under the recharging or charging condition, the accumulator device 4 can produce the radiation wave $R_2$. Therefore, disregarding that the heat conductor 1 is operating or not, or the illuminating device 2 and the accumulator device 4 are operating or not, the radiation wave $R_2$ will be produced continuously, unless that the accumulator device 4 is shut down.

On the other hand, the illuminating device 2 uses the light emitting diode element 21 as a primary source to excite into light. In terms of existing industrial technologies, an efficiency of that light emitting diode element 21 has been improved significantly and the light emitting diode element 21 can receive an operation of a pulse current. Therefore, the control circuit 41 is additionally provided with a pulse operation function to convert the electric current provided by the accumulator device 4 into a pulse wave which is transmitted to the light emitting diode element 21 for exciting into light. Under the condition that the light emitting diode element 21 excites into light by the pulse wave, lumen can be increased by a double.

The once-through passage 10 is supported by the chassis 100 which can be fixed on the ground surface, a yard or a top of a building, with any method, as long as that the location can receive irradiation of sunlight; for example, if being implemented at a road side, then the once-through passage 10 can be used as a traffic signal lamp or lamp post.

Regarding to installing the air screw 30, factors of weight and friction should be considered. The present invention uses the truss 32 to support the magneto generator 3 and the air screw 30 entirely. The air screw 30 is suspended downward, the bottom end can be the free end or can be slightly supported by a supporting pivot 13 which does not carry the weight of the air screw 30 but only guides a center of the air screw 30 for positioning. Therefore, the friction force resulted by the rotational energy of the air screw 30 only exists in the transmission shaft 31, and gravity force of the air screw 30 is received accordingly. Hence, the entire gravity of the air screw 30 will not occur at the position of the supporting pivot 13 and is suspended, so as to facilitate resisting the static friction force. Whereas, an entire weight of the magneto generator 3 is absorbed by the truss 32; hence, the weight of the magneto generator 3 will not operate the air screw 30. By the suspension, the air screw 30 can more freely rotate without any loading; in addition, to make the air screw 30 lighter, leaves in a light film are used, which are fixedly installed into a spiral shape.

As the resulted fluid pressure is the largest for the segment close to the outlet 102, the leaf area of the air screw 30 can be set as the maximum operating area, and then decreasing downward sequentially.

Figure 4:
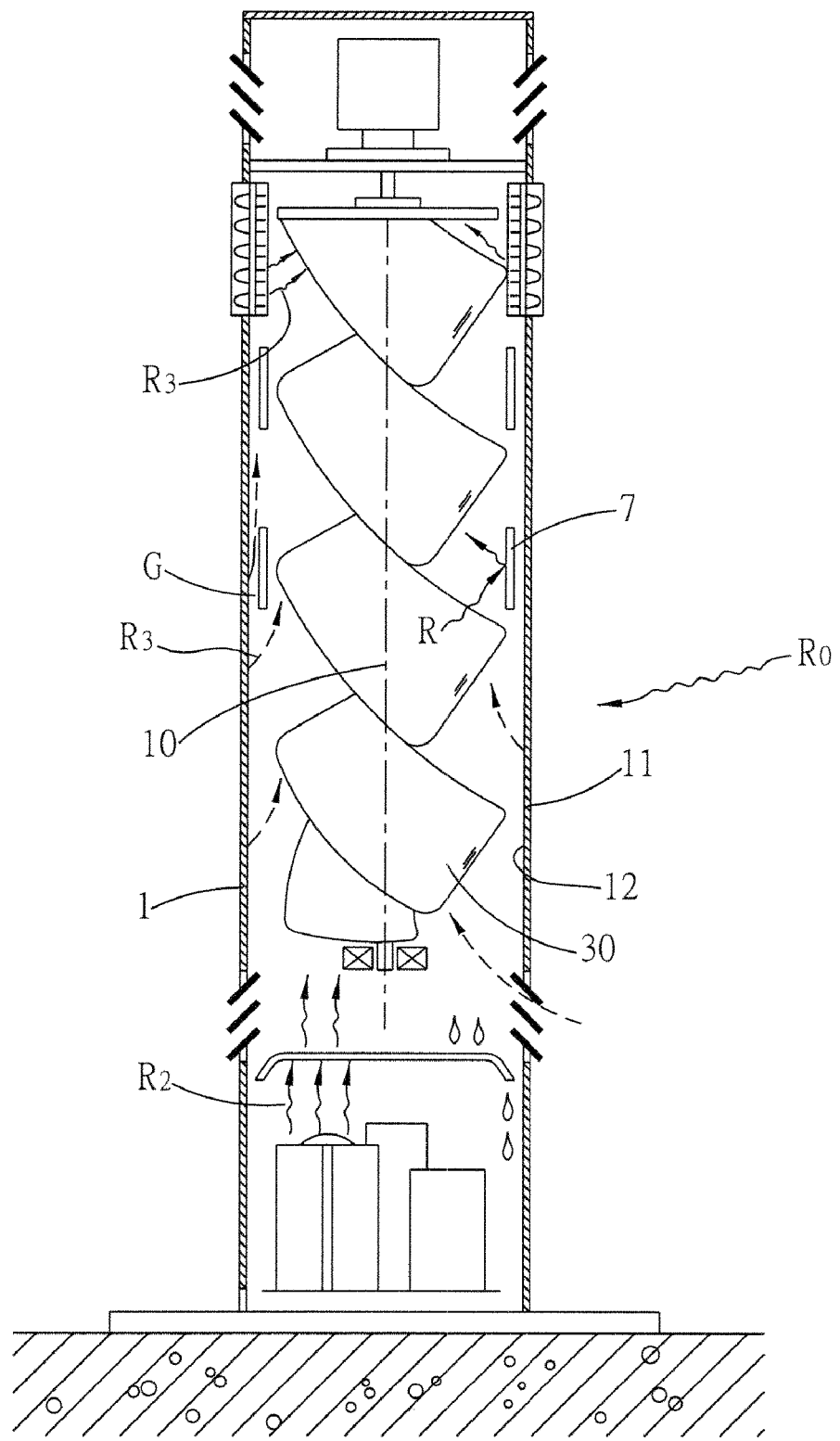
FIG. 4 shows a schematic view of installation of a reflection element of the present invention.
Figure 5:
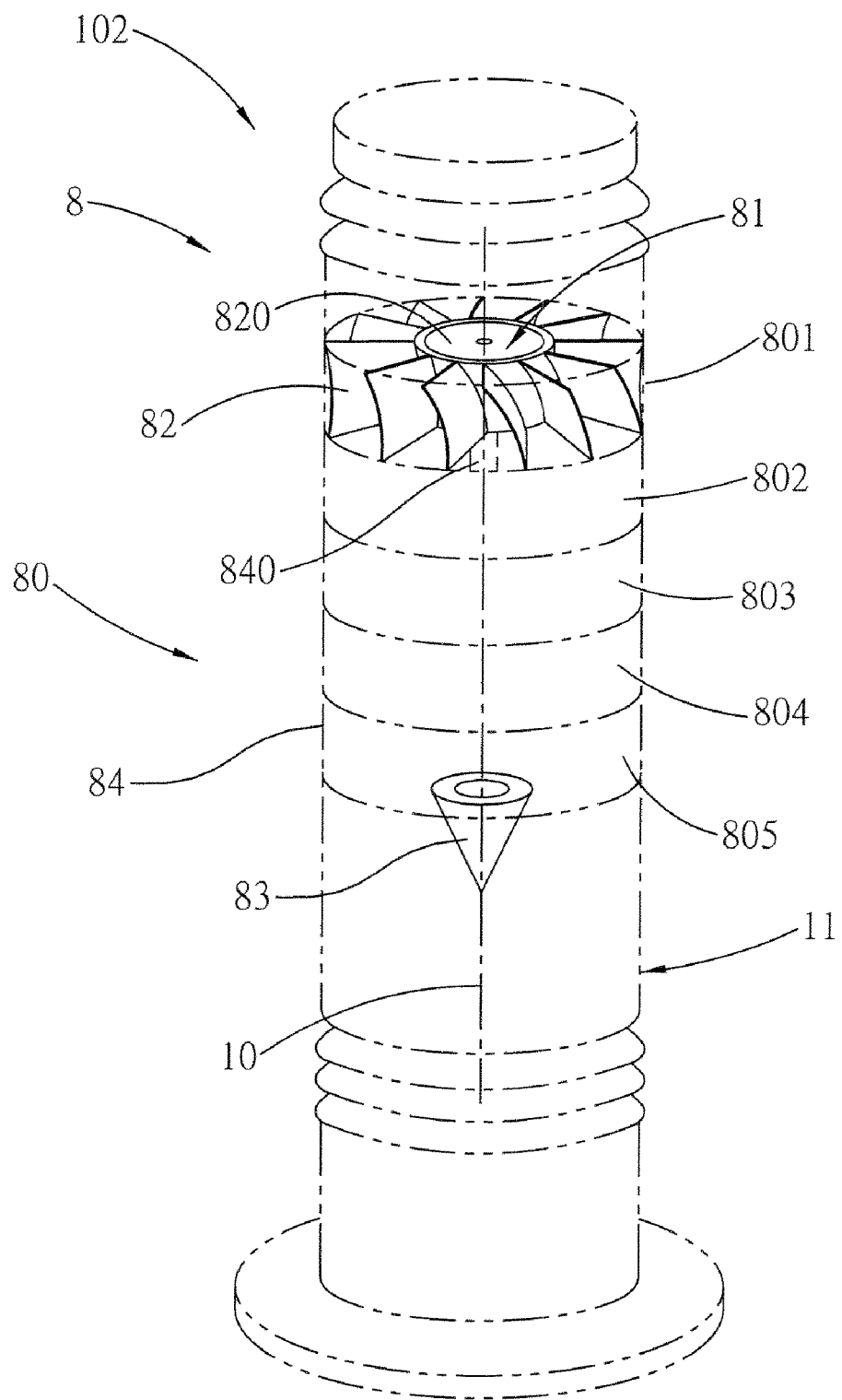
FIG. 5 shows a structural diagram of an implementation of a power generator unit of the present invention.

Referring to FIG. 4, after the heat absorption end 11 of the heat conductor 1 has received the solar radiation wave $R_0$, the heat mass transmitted by the working medium will operate the interior of the once-through passage 10. Disregarding the change of shape and position in the once-through passage 10, a sum of energy is not changed, and a residual of radiation wave R can be existed. When the radiation wave R operates the emission end 12, temperature of the emission end may be reduced to lose emission energy due to cold-hot alternation; therefore, an inner circumference of the heat conductor 1, related to a piping of the once-through passage 10, is provided with a reflection element 7 which is a plate or slab material, an inner surface of which is a smooth reflection surface. The reflection element 7 can be also a heat absorption unit, and as the reflection element 7 is provided inside the once-through passage 10, the state of heat absorption and radiation wave emission will not be restricted. It is primarily due to that the inner surface can be formed with the smooth reflection surface, and the residual radiation wave R can be reflected toward a center of the once-through passage 10; whereas, the reflected radiation wave R can be limited to the internal residual radiation that will not directly operate the emission end 12 of the heat conductor 1. In addition, the installation position of the reflection element 7 should be smaller than a radius of the once-through passage 10 in principle, and a gap G should be formed between the emission end 12, such that the air flow and thermal radiation can pass through the gap G, but that the radius should at least not affect the working diameter of the air screw 30.

Figure 8:
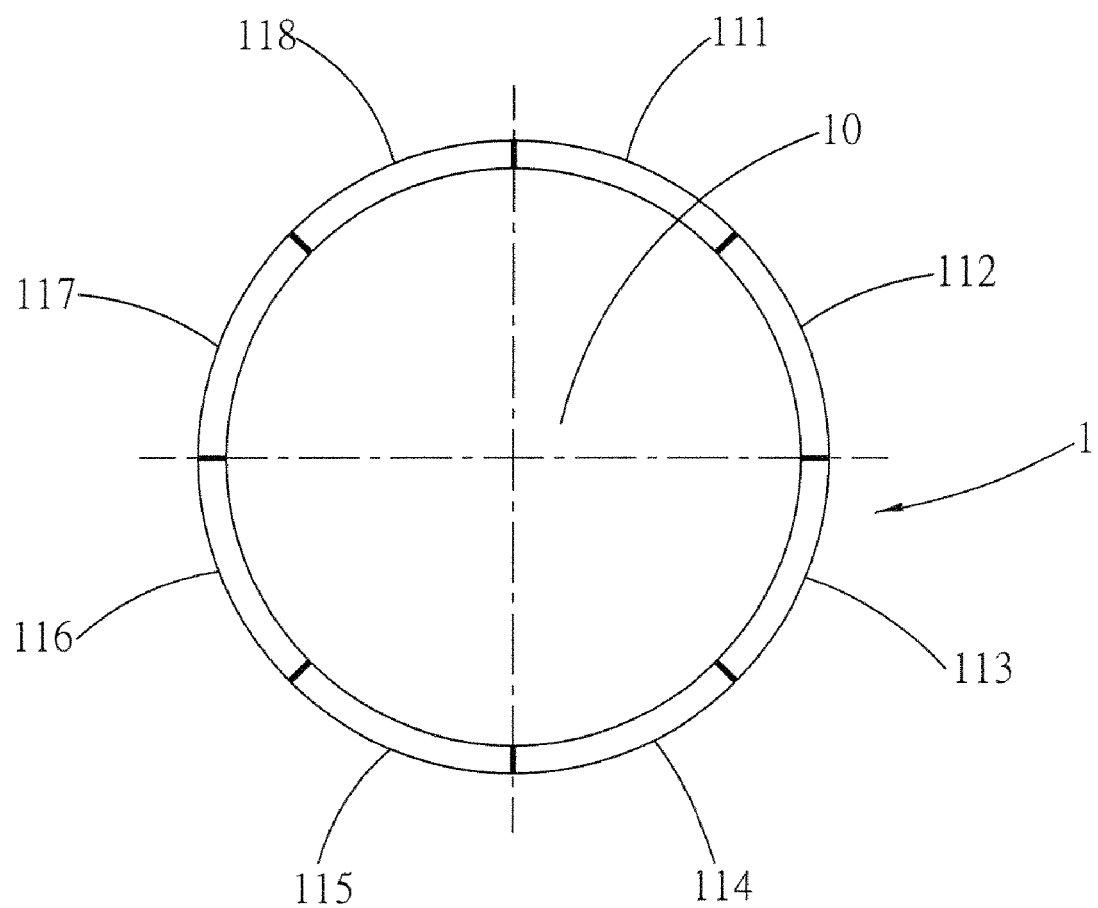
FIG. 8 shows a top view of a once-through passage of the present invention.

Referring to FIG. 8, the aforementioned power generator device can further use a plurality of power generators 8 in a shape of a circular and flat block, which are overlapped coaxially to constitute a power generator unit 80 and are installed at the central axis of the once-through passage 10, close to the outlet 102. The flat block power generator 8 includes a central power generating unit 81 and a plurality of symmetric leaves 82 distributed radially, which are linked to the power generating unit 81 through a connection end 820, wherein the leaves 82 are assembled in suspension with an axis of the power generating unit 81 through the connection end 820.

The power generating unit 81 generates electricity by cutting through a magnetic field, as usual. The central axis (not shown in the drawing) is driven by the leaves 81 through the connection end 820, and hence, after the leaves 81 have been driven by the air flow as aforementioned, the power generating unit 81 is driven to rotate to cut into an electric current which is used for illuminating through the aforementioned access control.

A lower end surface of the power generator 8 can be assembled with a guiding cone 83 to largely eliminate resistant force of the upward air flow of the once-through passage 10, such that the air flow can successfully flow to a space of the leaves 82.

The power generators 8 are overlapped coaxially to assemble into the power generator unit 80 which is formed as a multi-layer cascade, and a resultant electric current of a certain amount is produced for access and application, dependent upon an increase of the number of the power generators 8, with a premise that the air flow which is subjected to a heat function should be able to satisfy a need of multiple layers.

The aforementioned resultant current is produced by a series of power generators 801, 802, 803, 804, 805 that are overlapped coaxially, wherein, as described before, the closer to the outlet 102, the larger the air pressure; and hence, the current conversion rate of the topmost power generator 801 will be the largest. On the other hand, the lowest power generator 805 will produce a weaker electric current due to a weaker operation at an initial stage by a hot air flow reaction. However, after summing up all layers of the power generators 805, 804, 803, 802, 801, the satisfactory resultant current will be formed for access, which is similarly conducted by the mechanical-electrical reaction to be accessed and controlled for illuminating.

Below the aforementioned lowest power generator 805 and close to an axial end, the guiding cone 83 can be provided to guide the direction of air.

The configuration of power generator 8 can be like an ordinary flat-shape fan motor, with a height of the leaf 82 being a little smaller than that of the power generating unit 81, but roughly at a same level visually, which facilitates a stack arrangement. In addition, a center on an upper end surface of the leaf 82 is assembled with the connection end 820, and a center of the connection end 820 is pivoted with an axis of the power generating unit 81 (not shown in the drawing); therefore, the leaf 82 will be normally suspended like the air screw 30 as shown in FIG. 3, and a weight is also absorbed by the axis of the power generating unit 81. On the other hand, a housing 84 of the power generator 8 is assembled at an inner side of the once-through passage 10 to fix the power generating unit 81 at a center position through a connection rod 840, and a height of the housing 82 includes a total height of the leaf 82. Therefore, the multiple power generators 801, 802, 803, 804, 805 can be stacked together by a relative end surface of each housing 84.

Figure 6:
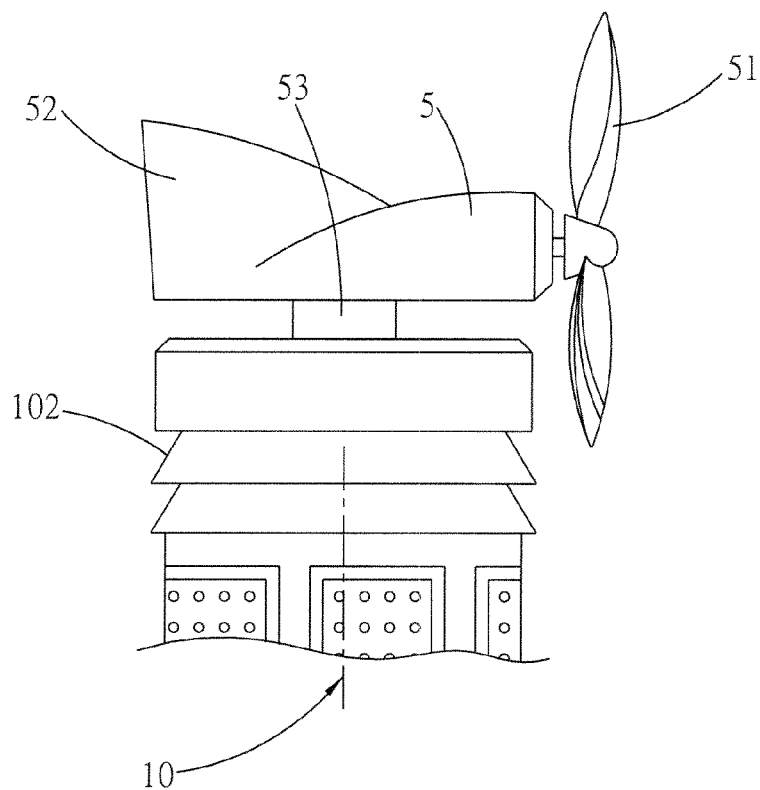
FIG. 6 shows a schematic view of an implementation of a wind driven generator device of the present invention.

Referring to FIG. 6, an upper end of the once-through passage 10 over a top of the outlet 102 can be provided with a wind driven generator device 5 which uses a propeller 51 to convert wind pressure of environment air flow into rotational force, so as to drive a power generating unit inside the wind driven generator device 5 to produce electricity. After production, the electricity can be similarly transmitted to the aforementioned accumulator device 4 (as shown in FIG. 4). When the wind driven generator device 5 is windward, a rudder 52 should be provided to push a front surface of the propeller 51 by wind pressure. The rudder 52 will be opposite to wind direction, guiding a front surface of the propeller 51 to correspond with streamlines of wind. Therefore, in addition to that the wind driven generator device 5 should rotate freely in accordance with an orientation of wind flow to transmit the electric current through a lead wire (not shown in the drawing), an armature 53 can be used to conduct indirectly, allowing the wind driven generator device 5 to change freely the windward orientation using the armature 53 as a center.

Figure 7:
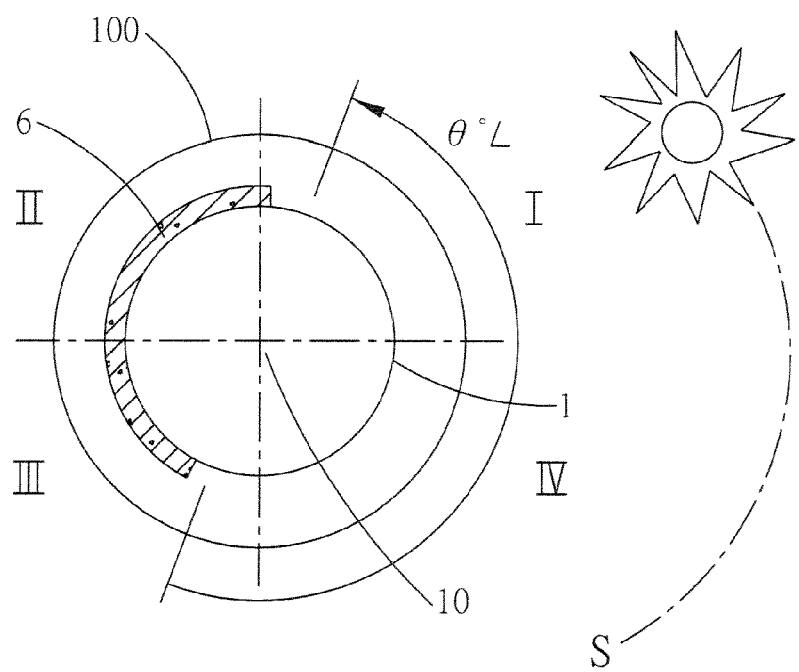
FIG. 7 shows a top view of the present invention.

Referring to FIG. 7, the present invention is placed in a position to receive sunlight. Following continuous running of sun, a running line S will be produced on a latitude of earth through rotation of earth (as shown in a top view of a change of position). Therefore, a direct illumination angle θ will be formed in quadrants I and II, whereas the other side of the once-through passage 10 that is backward to sun is a shadow side, which cannot receive solar energy explicitly. On the other hand, to avoid that the thermal radiation wave which is transferred into the once-through passage 10 will be depleted from the backlit side, the backlit side can be provided with a thermistor element 6 to form a thermal resistant effect, allowing the heat mass inside the once-through passage 10 not to be depleted from the backlit side.

The once-through passage 10 of the present invention (as shown in a top view of FIG. 8) is formed by surrounding with the heat conductor 1 which can be made by a mineral material or an alloy material and is integrally formed to constitute the once-through passage 10 of a hollow interior. To further consider a shape and scale of implementation, and to facilitate preparing the materials, the heat conductor 1 is separated into slab materials 111, 112, 113 . . . with each slab material 111, 112, 113 . . . being assembled linearly, and the once-through passage 10 being surrounded by at least three pieces of slab material. As shown in the drawing, a cross section can be close to a circle with 8 pieces and a cross section of each slab material 111, 112, 113 . . . can be provided with a curvature such that the once-through passage 10 can be even closer to a circle after surrounding.

The purpose of aforementioned separation is to facilitate a large-scale implementation. If more pieces of the slab material are assembled, then the inner diameter of the once-through passage 10 will be enlarged correspondingly. In addition, a demand of specification of various sizes can be coped with flexibly.

For the heat conductor 1 that is formed integrally, if a large quantity of stocks is required due to many kinds of specifications and a large-scale once-through passage 10 is needed, then a mold tool will be huge correspondingly, and it is not easy to carry the materials. Therefore, assembling with multiple pieces of slab material is used, wherein the production of slab materials 111, 112, 113 . . . can be made by the same and small-scale mold tool, which facilitates processing. Accordingly, it is very helpful to implement a drawing formation to the aluminum alloy for extracting a required length.

To assemble border lines adjacent to the slab materials 111, 112, 113 . . . latching, riveting, welding or pin joining with dry male and female lips (not shown in the drawing) can be used.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An illuminating device which accesses natural energy, an independent cylindrical unit, wherein a solar thermal radiation wave is absorbed and then operates air molecules inside a once-through passage, allowing an ionization speed of the air molecules to be increased, so as to form mechanical energy which is then converted into an electric current to be used for illumination through an access control, comprising:
   a cylindrical heat conductor, which is put upright on a ground surface, a hollow interior of which is formed with the once-through passage, an outer surface of which is a heat absorption end, an inner surface of which is an emission end, a lower end of which is provided with an inlet, and above which is provided with an outlet;
   a power generator unit, which is assembled at an end of the once-through passage close to the outlet in suspension, and includes an air screw and a magneto generator, with a transmission shaft being connected to the air screw which is suspended downward and overlapped on a center of the once-through passage;
   an illuminating device which is provided on an exterior of the once-through passage;
   an accumulator device which is provided below the inlet;
   a set of electric wire which is connected to each mechanical-electrical device; and
   a control circuit which operates the mechanical-electrical devices.

2. The illuminating device which accesses natural energy, according to claim 1, wherein the heat conductor is a piece of slab material, a plurality of which is assembled into a cylindrical unit, with a hollow part being formed as the once-through passage.

3. The illuminating device which accesses natural energy, according to claim 1, wherein the heat conductor is made by a blackbody-like mineral material.

4. The illuminating device which accesses natural energy, according to claim 1, wherein the heat conductor is a heat conducting metal alloy.

5. The illuminating device which accesses natural energy, according to claim 1, wherein a surface area of the emission end of the heat conductor is larger than that of the heat absorption end, allowing an emission rate to be larger than that of the heat absorption end.

6. The illuminating device which accesses natural energy, according to claim 1, wherein the air screw is a light air screw in a shape of a continuous spiral film.

7. The illuminating device which accesses natural energy, according to claim 1, wherein an inner circumference of the once-through passage, at a position of a smaller radius is provided with an inward reflection element.

8. The illuminating device which accesses natural energy, according to claim 1, wherein the accumulator device is parallel connected with a wind driven generator device at an upper end outside the once-through passage, through the control circuit.

9. An illuminating device which accesses natural energy, an independent cylindrical unit, wherein a solar thermal radiation wave is absorbed and then operates air molecules inside a once-through passage, allowing an ionization speed of the air molecules to be increased, so as to form mechanical energy which is then converted into an electric current to be used for illumination through an access control, comprising:
   a cylindrical heat conductor, which is put upright on a ground surface, a hollow interior of which is formed with the once-through passage, an outer surface of which is a heat absorption end, an inner surface of which is an emission end, a lower end of which is provided with an inlet, and above which is provided with an outlet;
   a power generator unit, which is constituted by a plurality of flat block power generators that are coaxially overlapped at an end of the once-through passage close to the outlet, with a center of each power generator being a power generating unit, a plurality of leaves being distributed radially, and the leaf being connected at an axis of the power generating unit in suspension through a connection end;
   an illuminating device which is provided on an exterior of the once-through passage;
   an accumulator device which is provided below the inlet;
   a set of electric wires which is connected to each mechanical-electrical device; and
   a control circuit which operates the mechanical-electrical devices.

10. The illuminating device which accesses natural energy, according to claim 9, wherein the heat conductor is a piece of slab material, a plurality of which is assembled into a cylindrical unit, with a hollow part being formed as the once-through passage.

11. The illuminating device which accesses natural energy, according to claim 9, wherein the heat conductor is made by a blackbody-like mineral material.

12. The illuminating device which accesses natural energy, according to claim 9, wherein the heat conductor is a heat conducting metal alloy.

13. The illuminating device which accesses natural energy, according to claim 9, wherein a surface of the emission end of the heat conductor is a rough surface, and an emission rate is larger than that of the heat absorption end.

14. The illuminating device which accesses natural energy, according to claim 9, wherein an inner circumference of the once-through passage, at a position of a smaller radius, is provided with an inward reflection element.

15. The illuminating device which accesses natural energy, according to claim 9, wherein the accumulator device is parallel connected with a wind driven generator device at an upper end outside the once-through passage, through the control circuit.

* * * * *